(12) United States Patent
Carroll

(10) Patent No.: US 6,847,865 B2
(45) Date of Patent: Jan. 25, 2005

(54) MINIATURE, UNMANNED AIRCRAFT WITH ONBOARD STABILIZATION AND AUTOMATED GROUND CONTROL OF FLIGHT PATH

(76) Inventor: Ernest A. Carroll, 12913 Alton Sq., No. 114, Herndon, VA (US) 20170

(*) Notice: Subject to any disclaimer, the term of this patent is extended or adjusted under 35 U.S.C. 154(b) by 41 days.

(21) Appl. No.: 10/255,183

(22) Filed: Sep. 26, 2002

(65) Prior Publication Data

US 2003/0060943 A1 Mar. 27, 2003

Related U.S. Application Data

(60) Provisional application No. 60/324,931, filed on Sep. 27, 2001.

(51) Int. Cl.$^7$ ............................................... B64C 13/20
(52) U.S. Cl. ................... 701/3; 701/4; 701/11; 701/23; 244/76 R; 244/190; 446/57
(58) Field of Search ........................... 701/3, 4, 11, 23, 701/28; 244/75 R, 76 R, 175, 181, 190, 189; 446/7, 34, 57

(56) References Cited

U.S. PATENT DOCUMENTS

| | | | | |
|---|---|---|---|---|
| 4,746,082 A | * | 5/1988 | Syms et al. | 244/137.4 |
| H628 H | * | 4/1989 | McIngvale | 342/33 |
| 4,964,598 A | * | 10/1990 | Berejik et al. | 244/190 |
| 5,035,382 A | * | 7/1991 | Lissaman et al. | 244/190 |
| 5,067,674 A | * | 11/1991 | Heyche et al. | 244/190 |
| 5,537,909 A | | 7/1996 | Schneider et al. | |
| 5,904,724 A | * | 5/1999 | Margolin | 701/120 |
| 6,062,176 A | | 5/2000 | Berger | |

* cited by examiner

*Primary Examiner*—William A. Cuchlinski, Jr.
*Assistant Examiner*—Eric M. Gibson
(74) *Attorney, Agent, or Firm*—David L. Banner

(57) ABSTRACT

A miniature, unmanned aircraft for acquiring and/or transmitting data, capable of automatically maintaining desired airframe stability while operating by remote directional commands. The aircraft comprises a fuselage and a wing, a piston engine and propeller, a fuel supply, at least one data sensor and/or radio transceiver, a microprocessor disposed to manage flight, a radio transceiver for receiving remotely generated flight direction commands, a GPS receiver, a plurality of control surfaces and associated servomechanisms, for controlling flight stabilization and direction, roll, pitch, yaw, velocity, and altitude sensors. The microprocessor uses roll, pitch, yaw, and altitude data to control attitude and altitude of the aircraft automatically, but controls flight direction solely based on external commands. The aircraft does not exceed fifty-five pounds.

19 Claims, 1 Drawing Sheet

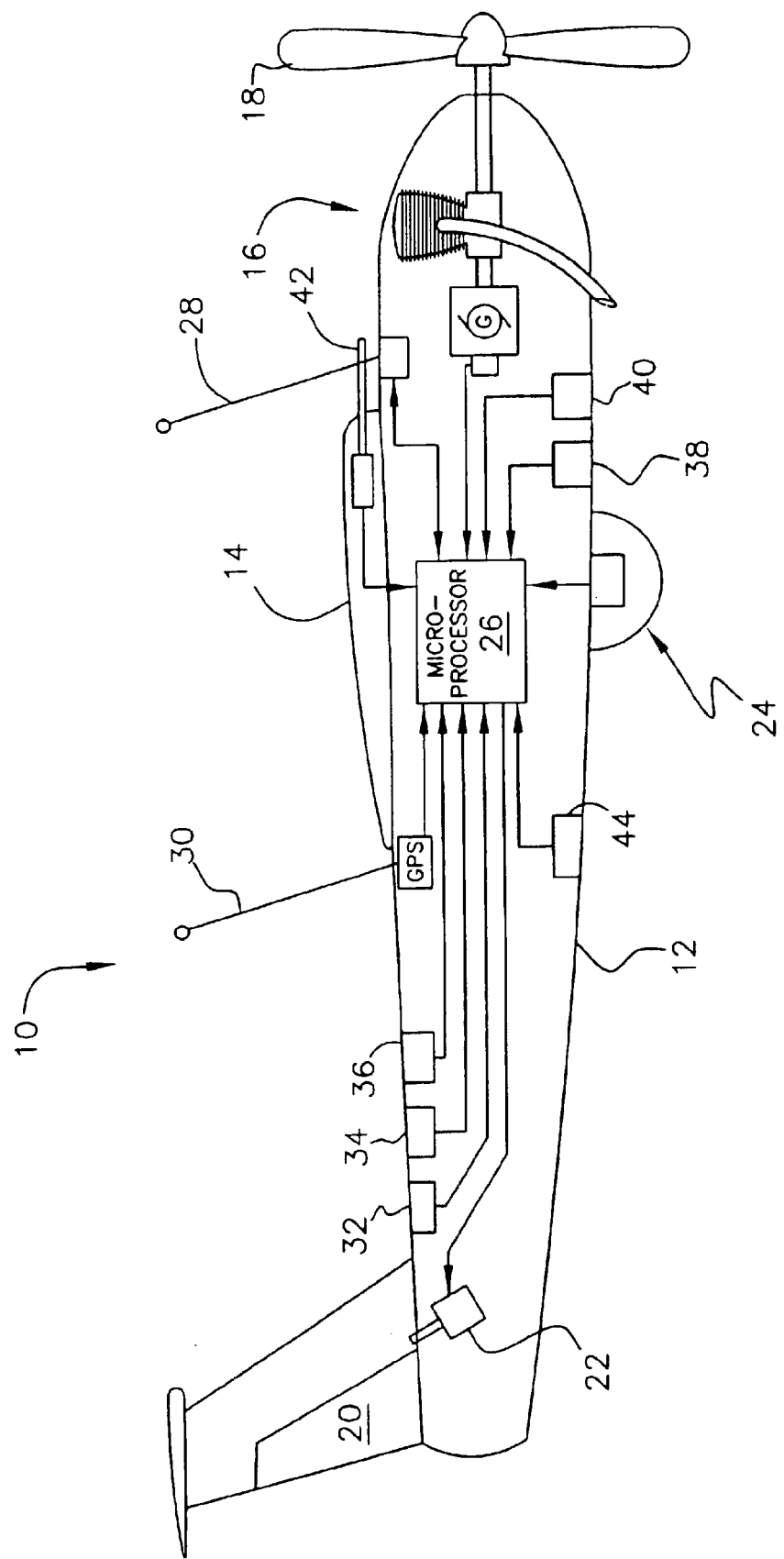

MINIATURE, UNMANNED AIRCRAFT WITH ONBOARD STABILIZATION AND AUTOMATED GROUND CONTROL OF FLIGHT PATH

REFERENCE TO RELATED APPLICATION

This application is related to copending applications respectively entitled UNMANNED AIRCRAFT WITH AUTOMATIC FUEL-TO-AIR MIXTURE ADJUSTMENT, Ser. No. 10/255,184 MINIATURE, UNMANNED AIRCRAFT WITH AUTOMATICALLY DEPLOYED PARACHUTE, Ser. No. 10/255,185; MANUALLY DISASSEMBLED AND READILY SHIPPABLE MINIATURE, UNMANNED MIRCRAFT WITH DATA HANDLING CAPABILITY, Ser. No. 10/255,182; ENGINE DRIVEN SUPERCHARGER FOR AIRCRAFT, Ser. No. 10/255,189 CABLE CONNECTIONS BETWEEN AN UNMANNED AIRCRAFT AND A DETACHABLE DATA HANDLING MODULE, Ser. No. 10/255,187; ELECTRIC POWER SUPPL SYSTEMFOR UMANNED AIRCRAFT, Ser. No. 10/255 188; and MINIATURE, UNMANNED AIRCRAFT WITH INTERCHANGEABLE DATA MODULE, Ser. No. 10/255,186, all filed Sep. 26, 2002 and which are incorporated herein by reference, and to Ser. No. 60/324,93 now abandoned, filed Sep. 27, 2001.

BACKGROUND OF THE INVENTION

1. Field of the Invention

The present invention relates to control of miniature unmanned aircraft, wherein directional control is remotely controlled, and other aspects of flight such as instantaneous attitude and altitude conditions are automatically controlled from within the aircraft.

2. Description of the Prior Art

Small, unmanned aircraft operate under certain constraints imposed by the government. Aircraft weighing less than fifty-five pounds, not able to reach speeds of two hundred miles per hour, and having flight direction controlled from the ground need not be licensed by civil air authorities. Because small, unmanned aircraft are capable of many civilian uses in gathering aerial data and transmitting data, it is extremely desirable to use them in place of larger, manned aircraft which operate at much greater costs, are subject to severe restrictions, and are susceptible to creating much more severe hazards in the event of mishaps.

Small unmanned remotely controlled aircraft, popularly known as "model" aircraft, have been utilized by hobbyists for years. Such aircraft, when built to sufficient scale, would be adequate in some ways to play a role in data acquisition and transfer. However, traditional model aircraft are intended to be flown within a limited radius from a person controlling the aircraft, under visual line-of-sight control, and usually over areas dedicated to that purpose. Utilizing small, unmanned aircraft over greater areas, for example by radio line-of-sight, on missions demanding greater precision in flight control imposes demands which cannot be met by traditional model aircraft.

One severe problem is that of maintaining appropriate attitude. When, for example, taking a sequence of optical scans, such as multispectral "pushbroom" scans, the data becomes much more useful, or more immediately useful, if taken from the same vantage point. Otherwise stated, it is desirable to maintain the data acquisition platform at a constant orientation to the surface of the earth. This is next to impossible to accomplish if relying upon the "line of sight", from the ground control methods of traditional model aircraft.

Constant orientation relative to the surface of the earth requires close control over both attitude and altitude of the aircraft. Flight control of aircraft could be entirely automated using sufficient sensors, combined with microprocessors and data inputs such as by the Global Positioning System (hereinafter, GPS) and by preprogrammed flight instructions. Particularly addressing civilian uses in the United States, it is highly desirable to have an unmanned aircraft which is light enough to avoid the fifty-five pound limit which is a threshold above which severe restrictions on use of an aircraft are imposed, and which cannot operate under sustained independent directional control. There exists a need art for aircraft which have minimized the burden of flight control imposed on external supervision by performing certain tasks internally, while still having directional control originating remotely, thereby avoiding undue restrictions on unmanned, miniature aircraft.

SUMMARY OF THE INVENTION

The present invention sets forth a method and apparatus for meeting the fore stated need. To this end, small, unmanned aircraft are provided with certain onboard flight sensors, radio reception capability, and an onboard microprocessor capable of processing internally generated positional and attitude data and externally generated directional control to arrive at attitude, altitude, and directional control sufficient to meet the needs of long range data acquisition and transfer. Directional control is derived from remote signals, while attitude and altitude control are provided in conjunction with other flight control aspects internally within the aircraft. The necessary apparatus is sufficiently small and light that the aircraft can accommodate many forms of data acquisition sensors and data conversion, retain data in memory, and transmit data to the ground, while still having significant range and altitude capabilities.

Accordingly, it is one object of the invention to provide a miniature, unmanned aircraft suitable for acquiring and transferring data, which can maintain flight stability automatically while operating under remote control as to flight path.

It is another object of the invention to minimize types of control which must be generated remotely, and limit this control to directional or flight path control.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWING

Various other objects, features, and attendant advantages of the present invention will become more fully appreciated as the same becomes better understood when considered in conjunction with the accompanying drawing, which is a diagrammatic, side elevational view of an aircraft equipped to practice the present invention.

DETAILED DESCRIPTION OF THE PREFERRED EMBODIMENTS

The drawing FIGURE shows a miniature, unmanned aircraft 10, the principal purpose of which is to acquire or transmit data or both. Acquisition of data signifies that aerial images of ground characteristics and other data may be obtained by sensors such as, for example, digital cameras from the air. Aircraft 10 has an airframe including a fuselage 12, a wing 14, a reciprocating piston internal combustion engine 16 and associated fuel supply system (not separately shown) carried aboard the airframe, and a propeller 18 drivably connected to engine 16. The engine will be understood to include a fuel supply system (not separately shown) carried aboard the airframe. The airframe supports control surfaces such as elevator, rudder, flaps, and ailerons. The latter are shown representatively by rudder 20. Each control surface has a servomechanism, shown representatively as servomechanism 22.

Aircraft 10 is capable of acquiring data or transmitting data or both acquiring and transmitting data. To this end, a mission data handling apparatus 24 disposed selectively to acquire data or transmit data or to both acquire and transmit data is provided. Apparatus 24 may be, for example, a multispectral instrument, an infrared or near infrared sensor, or any other sensor which may be carried aboard miniature, remotely controlled data gathering or transmitting aircraft.

Aircraft 10 has a remotely controlled guidance system having a microprocessor 26 disposed to manage flight, a radio frequency transceiver 28 carried aboard the aircraft and disposed to receive remotely generated flight direction commands and to communicate flight direction commands to microprocessor 26, a Global Positioning System (GPS) receiver 30, and a plurality of sensors disposed to sense data relating to stabilization and altitude of aircraft 10. These sensors include flight stabilization sensors including a roll sensor 32, a pitch sensor 34, and a yaw sensor 36, and redundant altitude sensors including a laser or acoustic altimeter 38 and a barometric pressure altimeter 40. A pitot tube 42 serves as a velocity sensor. A flux gate compass 44 determines direction of aircraft 10. The functions of pitot tube 42 and flux gate compass 44 may be redundantly supplemented by calculations using GPS signals considered with respect to time.

Microprocessor 26 will be understood to be a complete system including all necessary programming and memory devices (neither separately shown).

In operation, aircraft 10 is controlled from a suitable ground station (not shown) or other source of radio frequency command signals. These signals include directional commands which constitute the only source of directional instruction. No programming contained within microprocessor 26 includes predetermined directional instruction. However, programming provided within microprocessor is capable of processing inputs from the attitude and altitude sensors, and of generating command signals which are then transmitted to servomechanisms represented by servomechanism 22. In the preferred embodiment, microprocessor 26 can, by considering inputs from the various sensors and also GPS receiver 30, determine its location, attitude, altitude, and velocity. These characteristics may be transmitted to the ground station via transceiver 28. This arrangement avoids the restrictions which may be imposed on aircraft capable of guiding their own flight, since although the ground station operator knows where aircraft 10 is, where aircraft 10 is headed, and its velocity, only attitude and altitude data and internally derived command signals are generated within aircraft 10.

The invention is a method of controlling aircraft 10 such that flight stabilization is automatically performed within aircraft 10, and flight direction is performed exclusively by external remotely generated signals. The method comprises an initial step of providing aircraft 10 in the form described above.

A subsequent step is that of receiving remotely generated radio frequency flight direction commands on transceiver 28 and transmitting the flight direction commands to microprocessor 26.

Another step is that of causing at least one and preferably all of the flight stabilization sensors 32, 34, 36 to transmit sensed data to microprocessor 26. A further step is that of causing microprocessor 26 to process flight direction commands and sensed data relating to stabilization to generate stabilization and directional command signals, and transmitting generated stabilization and directional command signals to each of the servomechanisms represented by servomechanism 22.

A further step is that of determining the stabilization command signals to be transmitted to each servomechanism (e.g., servomechanism 22) at least in part from data sensed by the flight stabilization sensors.

Another step is that of determining directional command signals transmitted to each servomechanism based entirely and exclusively on direction commands received by transceiver 28.

The basic method set forth above may be expanded to include further steps of, first, receiving GPS signals on GPS receiver 30; next, processing received GPS signals within microprocessor 26 to determine altitude of aircraft 10; and next, generating altitude control commands for maintaining a selected altitude under control of microprocessor 26 and transmitting generated altitude control commands to each servomechanism (e.g., servomechanism 22).

A step of providing a plurality of attitude sensors of different types may be practiced. This is satisfied by providing roll sensor 32, a pitch sensor 34, and yaw sensor 36, or any other sensors providing equivalent function.

The basic method may be modified by adding a further step of providing an altitude sensor, such as laser or acoustic altimeter 38 or a barometric pressure altimeter 40 or both.

An advantageous additional step is that of limiting the gross weight of the aircraft to fifty-five pounds. Suitable construction for achieving this weight limit is set forth in copending application entitled, MINIATURE, UNMANNED AIRCRAFT WITH INTERCHANGEABLE DATA MODULE, Ser. No. 10/255,186, to which the reader is referred.

It is to be understood that the present invention is not limited to the embodiments described above, but encompasses any and all embodiments within the scope of the following claims.

I claim:

1. A method of controlling a miniature, unmanned aircraft capable of acquiring data or transmitting data or both acquiring and transmitting data, such that flight stabilization is automatically performed within the aircraft and flight direction is performed by external remotely generated signals, comprising the steps of:

providing a miniature, unmanned aircraft having an airframe including a fuselage, a wing, at least one control surface and at least one servomechanism disposed to operate a respective control surface, a reciprocating piston internal combustion engine and fuel supply system carried aboard the airframe, a propeller drivably connected to the engine, a mission data handling apparatus disposed selectively to acquire data or transmit data or to both acquire and transmit data, and a remotely controlled guidance system having a microprocessor disposed to manage flight, a radio frequency transceiver carried aboard the aircraft and disposed to receive remotely generated flight direction commands and to communicate flight direction commands to the microprocessor, and at least one flight stabilization sensor disposed to sense data relating to stabilization of the aircraft;

receiving remotely generated radio frequency flight direction commands on the transceiver and transmitting the flight direction commands to the microprocessor;

causing the flight stabilization sensor to transmit sensed data to the microprocessor;

causing the microprocessor to process flight direction commands and sensed data relating to stabilization to generate stabilization and directional command signals, and transmitting generated stabilization and directional command signals to at least one servomechanism;

determining the stabilization command signals transmitted to each servomechanism exclusively from data sensed by the flight stabilization sensor; and determining the directional command signals transmitted to each servomechanism based entirely and exclusively on direction commands received by the radio frequency transceiver.

2. The method according to claim 1, comprising the further steps of:

receiving GPS signals on a radio frequency receiver, processing received GPS signals within the microprocessor to determine altitude of the aircraft; and generating altitude control commands for maintaining a selected altitude by the microprocessor and transmitting generated altitude control commands to at least one servomechanism.

3. The method according to claim 1, wherein said step of providing a miniature, unmanned aircraft comprises the further step of providing a plurality of attitude sensors of different types.

4. The method according to claim 1, wherein said step of providing a miniature, unmanned aircraft comprises the further step of providing at least one of the group including a roll sensor, a pitch sensor, and yaw sensor.

5. The method according to claim 1, wherein said step of providing a miniature, unmanned aircraft comprises the further step of providing an altitude sensor.

6. The method according to claim 1, comprising the further step of limiting the gross weight of the aircraft to fifty-five pounds.

7. A miniature, unmanned, powered aircraft having remote guidance capability comprising:

a) an airframe comprising an internal combustion engine adapted to provide motive power to said aircraft, a plurality of control surfaces adapted to respectively control at least a direction of flight, an attitude, and an altitude of said aircraft, each of said control surfaces being operatively connected to and actuated by a respective servomechanism responsive to a control signal provided thereto from a microprocessor;

b) a radio receiver disposed within said airframe adapted to receive a directional control signal from a transmitter located remotely therefrom, said receiver generating a directional control output signal;

c) a microprocessor having a plurality of inputs, at least one of said plurality of inputs being operatively connected to said output of said radio receiver and adapted to receive said directional control output signal therefrom, said microprocessor having a plurality of outputs connected to respective ones of said servomechanisms for providing said control signals thereto;

d) a plurality of sensors for sensing flight conditions of said aircraft and for generating output signals representative of said flight conditions a respective outputs thereof, said outputs each being operatively connected to respective ones of said plurality of microprocessor inputs, said plurality of sensors being disposed proximate said airframe;

wherein said microprocessor, acting upon said output signals from said plurality of sensors, and said directional control signal from said radio receiver provides all control signals required to fly said aircraft to said servomechanisms, and wherein directional control information is received exclusively from said remote location via said radio receiver, and all other information required to fly said aircraft is received exclusively from said plurality of sensors.

8. The miniature, unmanned, powered aircraft having remote guidance capability as recited in claim 7, wherein at least one of said plurality of sensors comprises a GPS receiver.

9. The miniature, unmanned, powered aircraft having remote guidance capability as recited in claim 8, wherein said GPS receiver is used to sense at least one of the parameters: altitude, position, and time.

10. The miniature, unmanned, powered aircraft having remote guidance capability as recited in claim 7, wherein at least one of said plurality of sensors comprises at least of the group: roll sensor, pitch sensor, and yaw sensor.

11. The miniature, unmanned, powered aircraft having remote guidance capability as recited in claim 10, wherein at least one of said plurality of sensors comprises an altimeter.

12. The miniature, unmanned, powered aircraft having remote guidance capability as recited in claim 11, wherein said altimeter comprises at least one of the group: GPS altimeter, barometric pressure altimeter, laser altimeter, and acoustic altimeter.

13. The miniature, unmanned, powered aircraft having remote guidance capability as recited in claim 12, wherein said altimeter comprises redundant altimeter comprising at least two altimeters from the group: GPS altimeter, barometric pressure altimeter, laser altimeter, and acoustic altimeter.

14. The miniature, unmanned, powered aircraft having remote guidance capability as recited in claim 13, wherein each of said at least two altimeters comprises a different type of altimeter.

15. The miniature, unmanned, powered aircraft having remote guidance capability as recited in claim 7, wherein at least one of said plurality of control surfaces comprises at least of the group: a rudder, a flap, an elevators, and an aileron.

16. The miniature, unmanned, powered aircraft having remote guidance capability as recited in claim 7, wherein at least one of said plurality of sensors comprises a flux gate compass.

17. The miniature, unmanned, powered aircraft having remote guidance capability as recited in claim 7, wherein at least one of said plurality of sensors comprises a pilot tube velocity sensor.

18. The miniature, unmanned, powered aircraft having remote guidance capability as recited in claim 7, wherein said aircraft weight no more than fifty-five pounds.

19. A miniature, unmanned, powered aircraft having remote guidance capability, comprising:

a) an airframe comprising an internal combustion engine adapted to provide motive power to said aircraft, a plurality of control surfaces comprising at least one control surface from the group: a rudder, a flap, an elevators, and an aileron, said at least one control surface being adapted to respectively control at least a direction of flight, an attitude, and an altitude of said aircraft, each of said control surfaces being operatively connected to and actuated by a respective servomechanism responsive to a control signal provided thereto from a microprocessor;

b) a radio receiver disposed within said airframe adapted to receive a directional control signal from a transmitter located remotely therefrom, said receiver generating a directional control output signal c) a microprocessor having a plurality of inputs, at least one of said plurality of inputs being operatively connected to said output of said radio receiver and adapted to receive said direction control output signal therefrom, said microprocessor having a plurality of outputs connected to respective ones of said servomechanisms for providing said control signals thereto;

d) a plurality of sensors comprising at least one of the group: roll sensor, pitch sensor, and yaw sensor, an altimeter, a compass, and a velocity sensor for sensing flight conditions of said aircraft and for generating output signals representative of said flight conditions at respective outputs thereof, said outputs each being operatively connected to respective ones of said plurality of microprocessor inputs, said plurality of sensors being disposed proximate said airframe;

wherein said microprocessor, acting upon said output signals from said plurality of sensors, and said directional control signal from said radio receiver provides all control signals required to fly said aircraft to said servomechanisms, and wherein directional control information is received exclusively from said remote location via said radio receiver, and all other information required to fly said aircraft is received exclusively from said plurality of sensors, said aircraft weighing no more than fifty-five pounds.

* * * * *